United States Patent [19]

Tarui et al.

[11] Patent Number: 5,045,847
[45] Date of Patent: Sep. 3, 1991

[54] FLAT DISPLAY PANEL

[75] Inventors: Hisaki Tarui, Hirakata; Takao Matsuyama, Neyagawa; Noboru Nakamura; Shoichi Nakano, both of Hirakata; Yukinori Kuwano, Katano, all of Japan

[73] Assignee: Sanyo Electric Co., Ltd., Osaka, Japan

[21] Appl. No.: 298,095

[22] Filed: Jan. 18, 1989

[30] Foreign Application Priority Data

Jan. 19, 1988 [JP] Japan ................................. 63-10413

[51] Int. Cl.$^5$ ............................................. G09G 3/34
[52] U.S. Cl. .................................... 340/783; 340/719; 340/789; 340/786
[58] Field of Search ............... 340/783, 784, 719, 765, 340/766, 785, 786, 789; 350/334

[56] References Cited

U.S. PATENT DOCUMENTS

| | | | |
|---|---|---|---|
| 4,170,772 | 10/1979 | Bly | 340/783 |
| 4,499,458 | 2/1985 | Le Berre et al. | 340/783 |
| 4,636,786 | 1/1987 | Haertling | 340/783 |
| 4,751,509 | 6/1988 | Kubota et al. | 340/783 |
| 4,799,050 | 1/1989 | Prince et al. | 340/784 |

Primary Examiner—Jeffery A . Brier
Assistant Examiner—M. Fatahiyar
Attorney, Agent, or Firm—Armstrong, Nikaido, Marmelstein, Kubovcik & Murray

[57] ABSTRACT

The invention discloses a novel flat display panel suited for use with computer terminal equipment, television sets, or the like. The flat display panel first confines light in a core layer of a light wave guide, and then diminishes refractive index in part of the core layer by applying a specific vltage to it. Light transmitted from part of the core layer having diminished refractive index is then outputted outside from the light wave guide. Using the externally outputted light, the flat display panel displays figures. The flat display panel embodied by the invention minimizes the total thickness of the display panel itself. It effectively allows display of figures in a sizable visual area, and yet, allows display of figures at an extremely fast speed as well.

13 Claims, 4 Drawing Sheets

FLAT DISPLAY PANEL

BACKGROUND OF THE INVENTION

1. Field of the Invention

The present invention relates to a flat display panel used for displaying figures on a TV screen or in conjunction with operation of computer terminal equipment for example.

2. Description of the Prior Art

Conventionally, there are a variety of figure displaying apparatuses for use with computer terminal equipment or television sets, which normally include cathode ray tube (CRT) display, liquid crystal display (LCD), and electroluminecence display, for example. Nevertheless, any of those conventional figure-displaying apparatuses cited above still have problems to solve. Concretely, any of these conventional figure displaying apparatuses using CRT cannot thinly be constituted. LCD figure-displaying apparatus for example cannot easily accelerate displaying speed. In particular, it is quite difficult for any of conventional figure displaying apparatuses using electroluminecence to display figure on a large display area.

SUMMARY OF THE INVENTION

The invention securely overcomes those problems mentioned above by providing a novel flat display panel which first applies a specific voltage to a core layer so that refractive index of the core layer of light wave guide can partially vary itself to cause light confined in the core layer to externally be outputted from the portion where varied refractive index remains and then eventually displays figures by effectively applying the outputted light.

The primary object of the invention is to provide a novel flat display panel thinly-constituted by using light wave guide as the display panel itself.

The second object of the invention is to provide a novel flat display panel having a large display area.

The third object of the invention is to provide a novel flat display panel which is capable of displaying figures with sufficient volume of luminance.

The fourth object of the invention is to provide a novel flat display panel which is capable of displaying figures at a very fast velocity.

The fifth object of the invention is to provide a novel flat display panel which is capable of varying volume of light outputted from core layer by providing a device for properly adjusting intensity of light to be transmitted in core layer.

The sixth object of the invention is to provide a novel flat display panel which is capable of displaying color image by using light source composed of three primary colors and means for independently controlling intensity of light from the light source.

The above and further objects and features of the invention will more fully be apparent from the following detailed description with accompanying drawings.

DESCRIPTION OF THE PREFERRED EMBODIMENTS

Preferred embodiments of the flat display panel related to the invention are described below.

Figure 1:
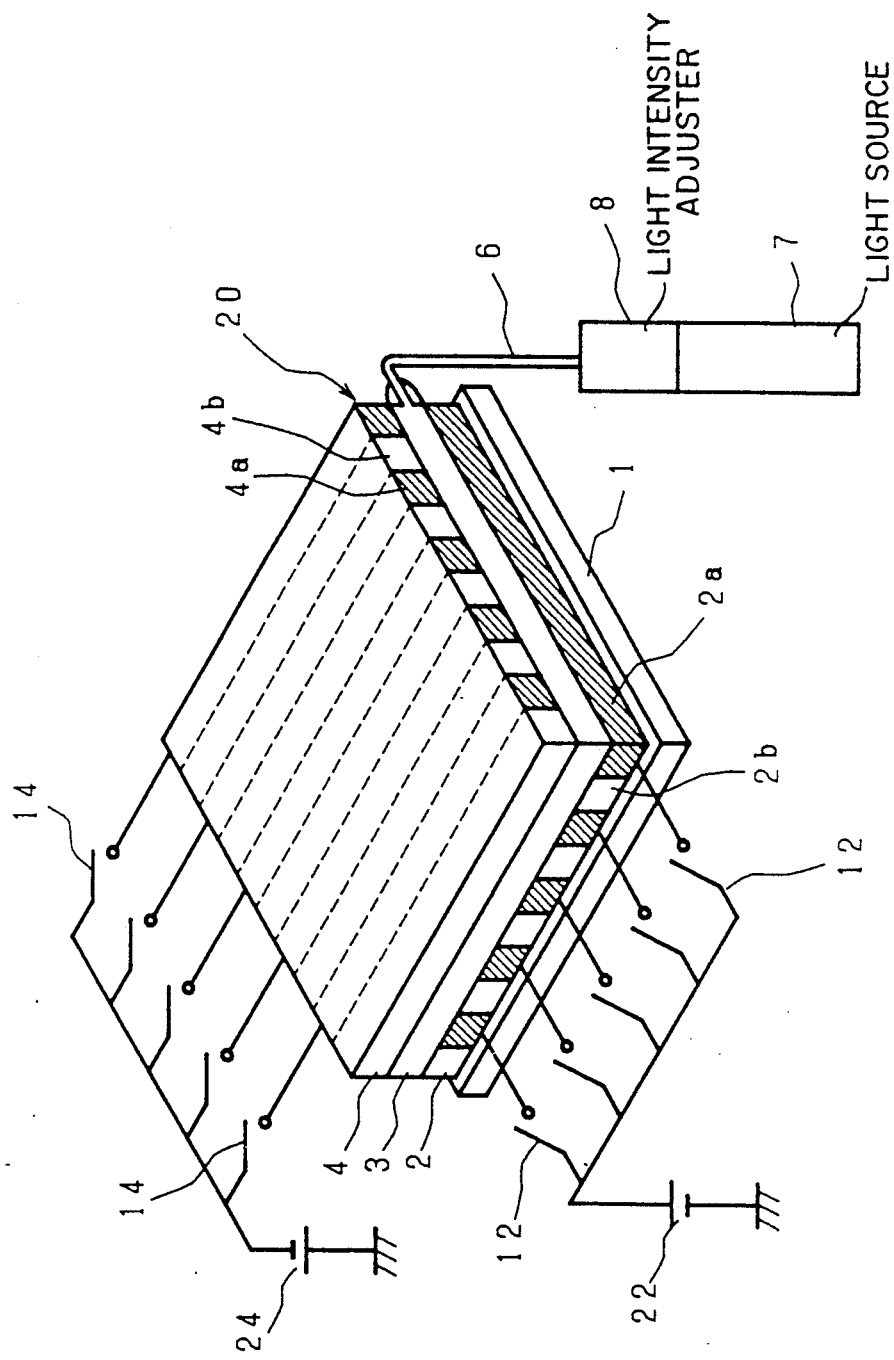
FIG. 1 is the perspective view of the flat display panel related to the invention.
Figure 2:
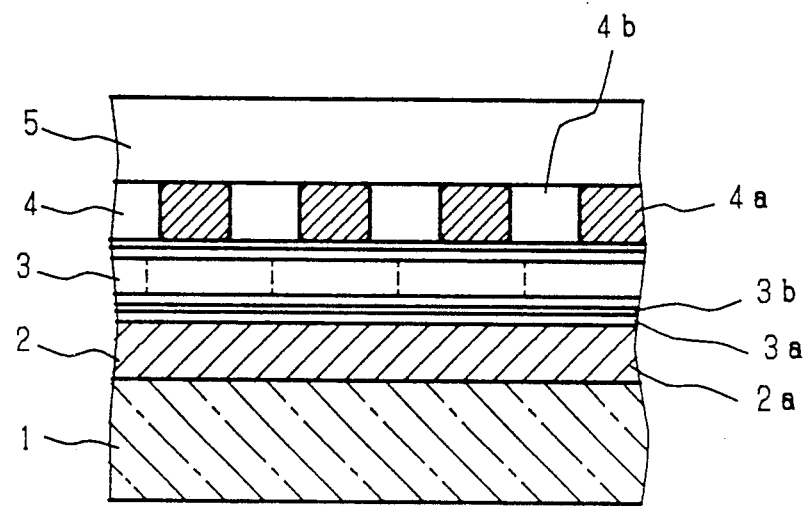
FIG. 2 is the sectional view of the flat display panel related to the invention.

FIG. 1 is the perspective view of the flat display panel related to the invention. FIG. 2 is the sectional view of the flat display panel shown in FIG. 1. The reference numeral 1 designates square-shaped base made from either glass sheet or stainless steel sheet for example. Core layer 3 is sandwiched between clad layers 2 and 4 which are stacked on the base 1 and integrally constitute square light wave guide 20 having an area slightly less than that of the base 1.

Clad layer 2 is constituted that a plurality of transparent conductive films 2a each having length identical to that of each side of light wave guide 20, 0.1 through a maximum of 1 micron of thickness, and 5 micron through a maximum of 1 mm of width, and these transparent conductive films 2a are respectively disposed in arrays with their longitudinal direction being in parallel with a side of the light wave guide 20. Each gap between adjoining transparent conductive films 2a is filled with insulated transparent films 2b each having a configuration identical to that of transparent conductive film 2a. Like clad layer 2, clad layer 4 has the constitution in which transparent conductive films 4a and insulated transparent films 4b are arranged in pattern. Each transparent conductive film 4a has longitudinal direction which is perpendicular to that of each transparent conductive film 2a of clad layer 2. Each of these transparent conductive films 2a and 4a is composed of ITO (Indium-Tin Oxide) having 2.0 of refractive index, whereas each of insulated transparent films 2b and 4b is composed of SiN (Silicon-Nitride) having 2.0 of refractive index, respectively.

Each of a plurality of switch circuits 12 is connected to each of a plurality of sheet-like transparent conductive films 2a of clad layer 2, while each of these switch circuits 12 is connected to power-supply source 22 used for scanning operation. Likewise, each of a plurality of switch circuits 14 is also connected to each of a plurality of sheet-like transparent conductive films 4a of clad layer 4, while each of these switch circuits 14 is also connected to power-supply source 24 used for scanning operation. A specific amount of voltage is applied to core layer 3 between transparent conductive films 2a and 4a by activating these switch circuits 12 and 14. Since longitudinal directions of transparent conductive films 2a and 4a cross each other at right angle, the system can control the application and non-application of voltage to core layer 3 by sectioning the entire core layer 3 into microlattice by activating switch circuits 12 and 14. Concretely, the system can control the application and non-application of voltage to each part of core layer 3 sectioned by a specific pitch identical to the pitch of the disposition of transparent conductive films 2a and 4a.

Substantially, core layer 3 is composed of superlattice structure which is provided with 30 layers 3a each being made from a-SiN as a valence layer and having 30 Å (angstrom) of thickness and another 30 layers 3b each being made from a-Si as a well layer and having 10 Å (angstrom) of thickness in the alternately laminated form. On receipt of voltage, refractive index varies itself. Note that core layer 3 has 2.05 of refractive index when no voltage is applied.

Multiple layers of protection films 5 are provided on the top surface of clad layer 4 for protecting light wave guide 20. Aluminum film is vapor-deposited all over the side surface of light wave guide 20 for reflection of light. Illustrations of protection film 5 and aluminum film are deleted in FIG. 1.

An end of light wave guide 20 is connected to an end of optical fiber 6, while the other end of optical fiber 6 is connected to light source 7 via light-intensity adjuster 8. Core layer of optical fiber 6 is connected core layer 3 of light wave guide 20, whereas clad layers of optical fiber 6 are connected to clad layers 2 and 4 of light wave guide 20. Light source 7 may be composed of either laser or light emitting diodes (LED). Light emitted from light source 7 first enters into light-intensity adjuster 8, which then properly adjusts luminance intensity so that the light can correctly match the luminescent spots. Intensity-adjusted light is then transmitted in core layer of optical fiber 6 before entering into core layer 3 of light wave guide 20. When no voltage is applied to core layer 3, it holds 2.05 of refractive index which is higher than 2.0 of the refractive index present in clad layers 2 and 4. Since aluminum film is vapor-deposited over the side surface of core layer 3, incoming light is confined inside of core layer 3.

Next, method of manufacturing the flat display panel featuring the above constitution is described below.

First, layer made from ITO having 2.0 of refractive index is vapor-deposited all over the base material 1 which is composed of a flat and square glass sheet or a stainless steel sheet by applying spattering process so that 0.1 through a maximum of 1 micron of thickness can be generated. Then, the ITO layer is coated with resist. Line base patterns having even pitches and parallel longitudinal directions are then exposed to light at a side of base 1. Next, specific patterns of transparent conductive films 2a made from ITO having 5 microns through a maximum of 1 mm of width are formed on the surface of base 1 by applying etching process. Next, SiN layer having 2.0 of refractive index is vapor-deposited on transparent conductive film 2a on the surface of base 1 by applying etching process so that the same layer thickness as that of ITO layer can be generated. Next, after removing resist, the SiN layer surface is leveled by means of spattering process before eventually completing clad layer 2.

Next, using either photo-chemical vapor deposition process (CVD) or plasma chemical vapor deposition process, each 30 layers of a-SiN layer each having 30 Å of layer thickness and a-Si layers each having 10 Å of layer thickness are alternately laminated on clad layer 2 so that core layer 3 having 2.1 of equivalent refractive index can eventually be formed.

Next, clad layer 4 which is composed of line patterns of transparent conductive film 4a and insulated transparent film 4b is formed by applying the same processes as was done for forming clad layer 2. In this case, longitudinal direction of transparent conductive film 4a should cross the longitudinal direction of transparent conductive film 2a at right angle. This completes light wave guide 20.

Next, each sheet-like transparent conductive film 2a of clad layer 2 is connected to each switch circuit 12 connected to power-supply source 22 used for scanning operation. Likewise, each sheet-like transparent conductive film 4a is connected to each switch circuit 14 connected to power-supply source 24 used for scanning operation. Next, one end of optical fiber 6 is connected to light wave guide 20 so that core layer of optical fiber 6 whose other end is connected to light source 7 via light-intensity adjuster 8 and core layer 3 of light wave guide 20, clad layer of optical fiber 6 and clad layers 2 and 4 of light wave guide 20, can respectively be connected to each other.

Finally, aluminum film (not shown) is vapor-deposited on the side surface of light wave guide 20, and then, protection film 5 is vapor-deposited on clad layer 4 of light wave guide 20 before eventually completing the flat display panel related to the invention.

Next, functional operation of the flat display panel related to the invention is described below.

Light emitted from light source 7 is initially transmitted to light-intensity adjuster 8, which then varies intensity of light before allowing it to permeate core layer of optical fiber 6. After passing through optical fiber 6, light then enters into core layer 3 of light wave guide 20. When no voltage is applied to core layer 3, since core layer 3 has specific refractive index which is higher than those of clad layers 2 and 4, light entering into core layer 3 is fully reflected by the surfaces bordering clad layers 2 through 4, and as a result, light cannot permeate clad layers 2 and 4. Since the side surface of core layer 3 is covered with aluminum film, light incident upon core layer 3 is reflected by aluminum film. As a result, when no voltage is applied to core layer 3, light entering into core layer 3 is confined inside thereof.

Figure 3:
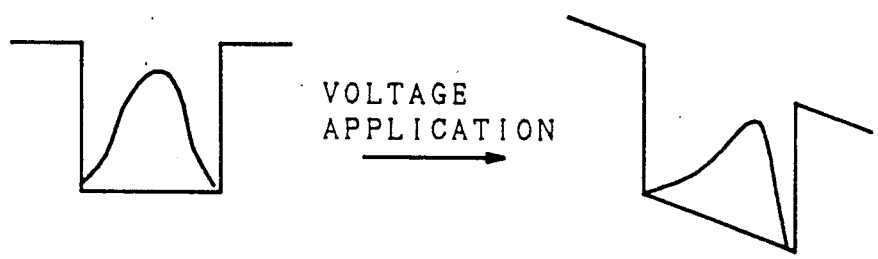
FIG. 3 is the schematic diagram showing variation of distribution of electrons when a specific amount of voltage is applied to core layer.
Figure 4:
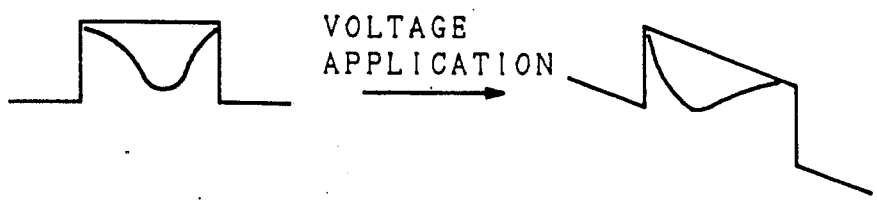
FIG. 4 is the schematic diagram showing variation of distribution of positive holes when a specific amount of voltage is applied to core layer.

When switch circuits 12 and 14 are closed, voltage is applied to core layer 3 present in the corresponding position. This causes variation to occur in the distribution of electrons and positive holes inside of well layers in the core layer 3 constituting superlattice, thus causing the internal polarizability (i.e., refractive index) to vary itself. FIGS. 3 and 4 are respectively the schematic diagrams representing transition of variations. FIG. 3 represents variation of the distribution of electrons inside of conduction band of well layer having superlattice constitution. FIG. 4 represents variation of the distribution of positive holes inside of valence band of well layer having superlattice constitution. As is clear from FIGS. 3 and 4, when a specific amount of voltage is applied to core layer 3, distribution of electrons and positive holes biases.

Figure 5:
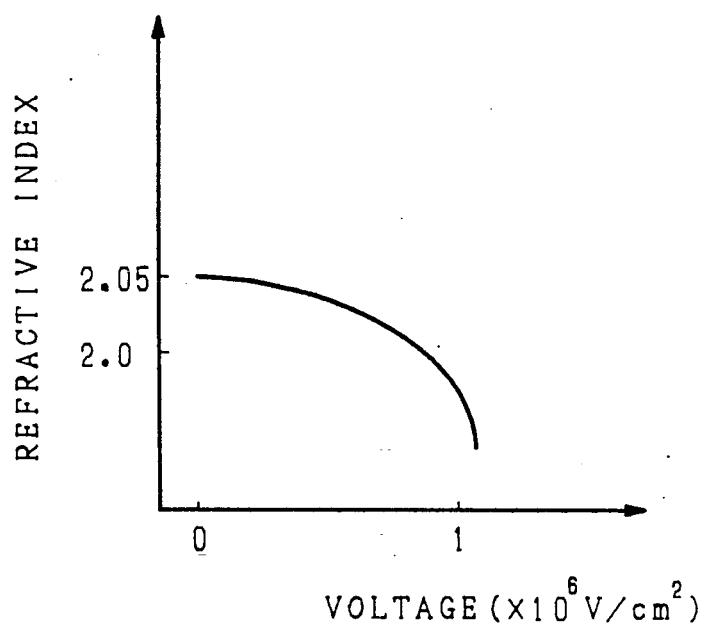
FIG. 5 is the graph showing of the relationship between the applied voltage and refractive index of core layer.

FIG. 5 is the graph showing the relationship between voltage applied to core layer 3 and refractive index of core layer 3. Horizontal axis represents voltage, whereas vertical axis represents refractive index. As is clear from FIG. 5, as the level of applied voltage rises, refractive index of core layer 3 diminishes. For example, if about $1 \times 10^6$ V/cm² of voltage is applied, refractive index of core layer 3 becomes lower than 2.0 of refractive index present in clad layers 2 and 4.

Figure 6:
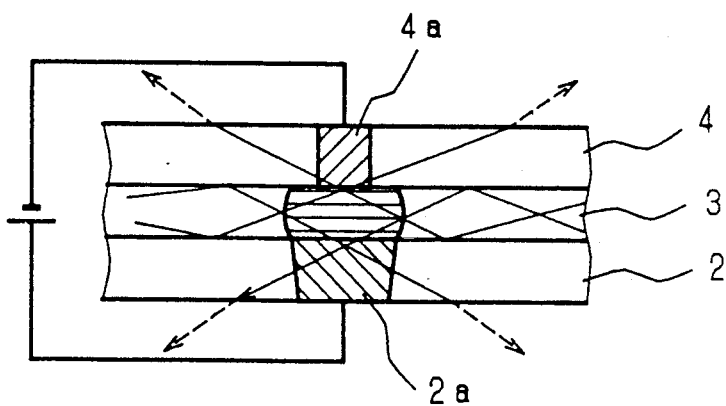
FIG. 6 is the schematic diagram showing the light path when a specific amount of voltage is applied to core layer.
Figure 7:
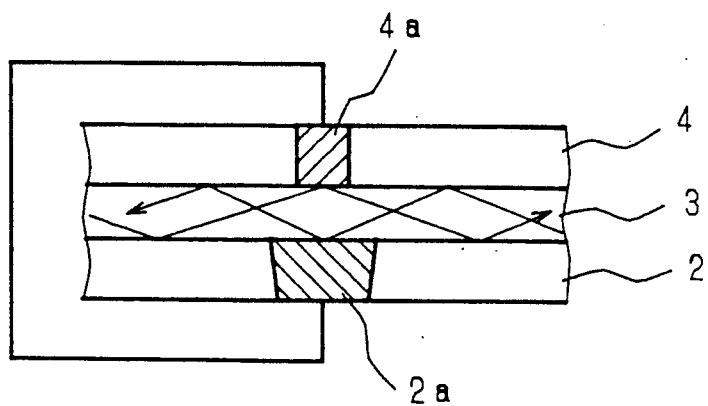
FIG. 7 is the schematic diagram showing the light path when no voltage is applied to core layer.

As soon as refractive index of core layer 3 becomes lower than 2.0 of refractive index of clad layers 2 and 4, light confined inside of core layer is outputted from light wave guide 20 via clad layers 2 or 4. FIG. 6 shows this condition. FIG. 7 is a reference diagram showing the condition in which light is still confined inside of core layer 3 when no voltage is applied.

Next, using light outputted from light wave guide 20, figure displaying operation is executed. By operating switch circuits 12 and 14, voltage-applicable region can optionally be provided. This allows operator to optionally set a specific region from which light is externally outputted. Operator can vary volume of outputted light by varying intensity of light entering into core layer 3 via light-intensity adjuster 8. Consequently, the flat display panel embodied by the invention can draw optional image by synchronizing the timing of setting a specific region from which light is externally outputted and the timing of setting the intensity of light.

By executing those processes mentioned above, the flat display panel related to the invention displays image using light externally outputted from light wave guide while scanning the voltage applied to core layer of light wave guide.

The flat display panel embodied by the invention effectively utilizes light wave guide which substantially constitutes the main body of the flat display panel. Availing of this advantageous constitution, it is possible for the invention to constitute a novel flat display panel whose entire thickness is merely a maximum of 1 cm. Manufacturers can easily execute either spattering process or metal vapor-deposition process on a properly selected substrate having about 30 square centimeters for securely manufacturing the flat display panel related to the invention. As a result, the invention can easily provide such a useful flat display panel having a wide visual area. Furthermore, the flat display panel embodied by the invention generates brighter luminance and provides faster presentation of display than any of conventional LCD displays.

The above preferred embodiment of the flat display panel has introduced layers composed of the laminated combination of layers of a-Si and a-SiN for constituting microlattices of core layer 3. It should be understood that the scope of the invention is not limited to the use of a-Si and a-SiN, but the invention also allows the use of any other constituents of microlattice such as the laminated combination of layers of InP (Indium phosphide) and GaP (Gallium Phosphide) for example.

The invention also provides a possibility for displaying color image by independently controlling intensity of light source composed of three primary colors.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A flat display panel, comprising:
 a light wave guide, including
 (a) pair of generally parallel clad layers, and
 (b) a core layer sandwiched between said clad layers and having an index of refraction greater than that of said clad layers;
 an optical means for transmitting light to said core layer; and
 voltage applying means for applying voltage to at least a selected portion of said core layer for decreasing the index of refraction of said selected portion of core layer to an index of refraction less than that of at least one of said clad layers, such that light is output through a portion of at least one of said clad layers corresponding to said selected portion of said core layer.

2. The flat display panel as set forth in claim 1, wherein said core layer has a substantially superlattice structure.

3. The flat display panel as set forth in claim 2, wherein said core layer has a plurality of alternately laminated amorphous SiN (silicon nitride) layers and amorphous Si (silicon) layers.

4. The flat display panel as set forth in claim 2, wherein said core layer has a plurality of alternately laminated InP (indium phosphide) layers and GaP (gallium phosphide) layers.

5. The flat display panel as set forth in claim 1, wherein each of said clad layers includes a plurality of transparent conductive films and a plurality of insulated transparent films alternating and in parallel with one another in a width direction.

6. The flat display panel as set forth in claim 5, wherein said alternating parallel films of one of said clad layers are substantially perpendicular to the films of the other of said clad layers.

7. The flat panel as set forth in claim 5, wherein a plurality of switches are respectively connected between a power-supply source and said transparent conductive films of said clad layers.

8. The flat display panel as set forth in claim 5, wherein said transparent conductive films are made of ITO (indium-tin oxide), and wherein said insulated transparent films are made of SiN (silicon nitride).

9. The flat display panel as set forth in claim 1, wherein said optical means comprises:
 a light source;
 intensity adjusting means for adjusting the intensity of light from said light source; and
 an optical fiber which transmits light from said light source to said core layer.

10. The flat display panel as set forth in claim 9, wherein said light source is selected from a group consisting of a laser and a light-emitting diode.

11. The flat display panel as set forth in claim 9, wherein said light source comprises three primary colors.

12. The flat display panel as set forth in claim 11, further comprising a control means for independently controlling the intensity of light from said light source comprising three primary colors.

13. The flat display panel as set forth in claim 1, wherein said optical means transmits light to said core layer without passing through either of said clad layers.

* * * * *